(12) United States Patent
Taylor

(10) Patent No.: US 7,620,234 B2
(45) Date of Patent: Nov. 17, 2009

(54) IMAGE PROCESSING APPARATUS AND METHOD FOR GENERATING A THREE-DIMENSIONAL MODEL OF AN OBJECT FROM A COLLECTION OF IMAGES OF THE OBJECT RECORDED AT DIFFERENT VIEWPOINTS AND SEGMENTED USING SEMI-AUTOMATIC SEGMENTATION TECHNIQUES

(75) Inventor: Richard Ian Taylor, Berkshire (GB)

(73) Assignee: Canon Kabushiki Kaisha, Tokyo (JP)

( * ) Notice: Subject to any disclaimer, the term of this patent is extended or adjusted under 35 U.S.C. 154(b) by 2014 days.

(21) Appl. No.: 09/969,843

(22) Filed: Oct. 4, 2001

(65) Prior Publication Data

US 2002/0064305 A1 May 30, 2002

(30) Foreign Application Priority Data

Oct. 6, 2000 (GB) .................................. 0024593.6

(51) Int. Cl.
*G06K 9/00* (2006.01)
(52) U.S. Cl. ........................ 382/154; 382/164; 382/171; 382/173; 345/419; 345/420; 715/723; 715/838
(58) Field of Classification Search ......... 345/419–420; 715/723, 838; 382/154, 164, 171, 173
See application file for complete search history.

(56) References Cited

U.S. PATENT DOCUMENTS 5,355,446 A * 10/1994 Maayan ....................... 345/626

(Continued)

FOREIGN PATENT DOCUMENTS

EP 0 790 584 A2 8/1997

(Continued)

OTHER PUBLICATIONS

Matusik et al., "Image-Based Visual Hulls", Proceedings of the 27th Annual Conference on Computer Graphics and Interactive Techniques, ACM-SIGGRAPH, Jul. 2000.*

(Continued)

*Primary Examiner*—Wesley Tucker
(74) *Attorney, Agent, or Firm*—Fitzpatrick, Cella, Harper & Scinto

(57) ABSTRACT

In an image processing apparatus 2, images of a subject object 210 and data defining the positions and orientations at which the images were recorded are processed to generate a three-dimensional computer model of the subject object 210. As part of the processing, image data relating to the subject object 210 is segmented from other image data in each input image. The results of the segmentation processing are displayed to a user and the apparatus is operable by the user to edit the segmentation processing to correct any errors. Such errors typically occur due to the misclassification of pixels relating to shadows in an input image as part of the subject object 210 and the misclassification of pixels relating to features on the surface on which the subject object 210 is placed for imaging as part of the subject object 210. The facility to edit the image data segmentations therefore provides the user with greater flexibility in the lighting conditions which can be used for imaging and greater flexibility in the selection of the surface on which the subject object 210 is placed. The results of the segmentation processing, including any edited results, are used to generate a three-dimensional computer model of the subject object 210.

23 Claims, 12 Drawing Sheets

U.S. PATENT DOCUMENTS

| | | | | |
|---|---|---|---|---|
| 5,815,683 | A | 9/1998 | Vogler | 395/500 |
| 5,832,134 | A * | 11/1998 | Avinash et al. | 382/257 |
| 5,960,125 | A | 9/1999 | Michael et al. | 382/294 |
| 6,337,925 | B1 * | 1/2002 | Cohen et al. | 382/199 |
| 6,356,272 | B1 * | 3/2002 | Matsumoto et al. | 345/582 |
| 6,434,260 | B1 * | 8/2002 | Soferman et al. | 382/131 |
| 6,681,043 | B1 * | 1/2004 | Lau et al. | 382/173 |
| 2001/0056308 | A1 | 12/2001 | Petrov et al. | 700/98 |
| 2002/0050988 | A1 | 5/2002 | Petrov et al. | 345/418 |
| 2003/0099397 | A1 * | 5/2003 | Matsugu et al. | 382/173 |
| 2003/0197785 | A1 * | 10/2003 | White et al. | 348/207.99 |

FOREIGN PATENT DOCUMENTS

| | | |
|---|---|---|
| EP | 0 794 516 A2 | 9/1997 |
| EP | 0 794 517 A1 | 9/1997 |
| EP | 0 898 245 A1 | 2/1999 |
| EP | 0 930 583 A1 | 7/1999 |
| GB | 2 325 996 A | 12/1998 |
| JP | 9-170914 | 6/1997 |
| WO | WO 98/18117 | 4/1998 |
| WO | WO 01/39124 A2 | 5/2001 |

OTHER PUBLICATIONS

J. Noble, "GOF Patterns for GUI Design", MRI School of MPCE, Macquarie University, Jun. 1997.*

C. Gu and M. Lee, "Semiautomatic Segmentation and Tracking of Semantic Video Objects", IEEE Transactions on Circuits and Systems for Video Technology, vol. 8, No. 5, Sep. 1998.*

A. Laurentini, "The Visual Hull Concept for Silhouette-Based Image Understanding", IEEE Transactions on Pattern Analysis an Machine Intelligence, vol. 16, No. 2, Feb. 1994.*

Peter Eisert, Eckehard Steinbach, Bernd Girod, "Automatic Reconstruction of Stationary 3-D Objects from Multiple Uncalibrated Camera Views," IEEE Transactions on Circuits and Systems for Video Technology, vol. 10, No. 2, Mar. 2000, pp. 261-277.

Wolfgang Niem, Jochen Wingbermuhle, "Automatic Reconstruction of 3D Objects Using a Mobile Monoscopic Camera", IEE Proceedings, International Conference on Recent Advances in 3-D Digital Imaging and Modeling, Mar. 1997, pp. 173-180.

Illingworth, J., A. Hilton, Looking to Build a Model World: Automatic Construction of Static Object Models Using Computer Vision, Electronics and Communication Engineering Journal, Jun. 1998, pp. 103-113.

Lorensen, William E., Harvey E. Cline, Marching Cubes: A High Resolution 3D Surface Construction Algorithm, Computer Graphics, vol. 21, No. 4, Jul. 1987, pp. 163-169.

"Automatic Reconstruction of 3d Objects Using a Mobile Camera" by Niem in Image and Vision Computing 17 (1999), pp. 125-134.

"The Lumigraph" by Gortler et al., in Computer Graphics Proceedings, Annual Conference Series, 1996, ACM-0-89791-746-4/96/008.

"Rapid Octree Construction from Image Sequences" by Szeliski in GVGIP: Image Understanding, vol. 58, No. 1, Jul. 1993, pp. 23-32.

"What Do N Photographs Tell Us About 3D Shape?" by Kiriakos Kutulakos and Steven Seitz, University of Rochester Computer Sciences Technical Report No. 680, Jan. 1998.

"A Theory of Shape by Space Carving" by Kiriakos Kutulakos and Steven Seitz, University of Rochester Computer Sciences Technical Report No. 692, May 1998.

"An Implicit Surface Polygonizer" by Bloomenthal, Graphics Gems IV, AP Professional, 1994, ISBN 012-336155-9, pp. 324-350.

"Euclidean Reconstruction From Unicalibrated Views" by Hartley in Applications of Invariance in Computer Vision, Mundy, Zisserman and Forsyth, eds, pp. 237-256, Azores 1993.

* cited by examiner

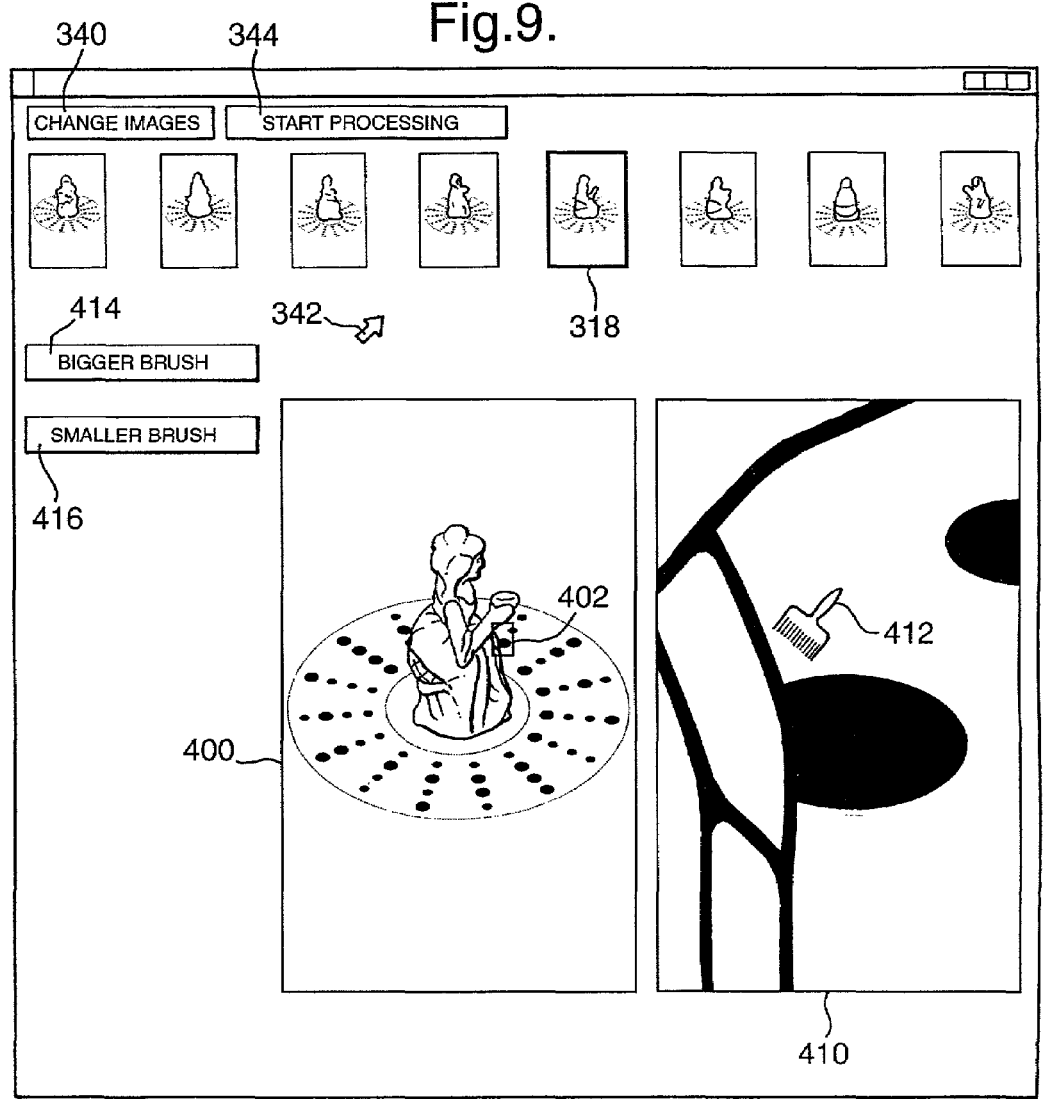

IMAGE PROCESSING APPARATUS AND METHOD FOR GENERATING A THREE-DIMENSIONAL MODEL OF AN OBJECT FROM A COLLECTION OF IMAGES OF THE OBJECT RECORDED AT DIFFERENT VIEWPOINTS AND SEGMENTED USING SEMI-AUTOMATIC SEGMENTATION TECHNIQUES

The present invention relates to the computer processing of image data defining images of an object recorded at different positions and orientations to calculate the positions and orientations at which the which the images were recorded and to generate a three-dimensional (3D) computer model of the object.

3D computer models of objects are useful for many applications. In particular, 3D computer models are often used in computer games and for computer aided design (CAD) applications. In addition, there is now a growing demand to have 3D computer models of objects for uses such as the embellishment of Internet sites etc.

Many methods are known for generating 3D computer models of objects. In particular, methods are known in which images of an object to be modelled are recorded at different positions and orientations. Each recorded image is then processed to calculate the position and orientation at which it was recorded, and a 3D computer model of the object is generated using the input images and the calculated positions and orientations.

In these known methods, the object to be modelled may be imaged alone, and the position and orientation of each image calculated by matching features on the object between the different input images. Examples of such a technique are described, for example, in EP-A-0898245.

Alternatively, the subject object being modelled may be placed on a calibration object having a known pattern of features thereon, and images of the subject object together with the calibration object recorded at different positions and orientations. Each recorded image is then processed to calculate the position and orientation at which is was recorded on the basis of the positions of the features in the calibration object's pattern in the image. Examples of this technique are described, for example, in "Automatic Reconstruction of 3D Objects Using A Mobile Camera", by Niem in Image and Vision Computing 17 (1999) pages 125-134, "The Lumigraph" by Gortler et al in Computer Graphics Proceedings, Annual Conference Series, 1996 ACM-0-89791-764-4/96/008, JP-A-9-170914 and the applicant's co-pending PCT patent application GB00/04469 (WO-A-01/39124) (the full contents of which are incorporated herein by cross-reference).

Once the positions and orientations of the input images have been calculated, a popular way to generate the 3D computer model of the subject object is to process each input image to segment (separate) image data relating to the subject object from other image data, and then to perform what is known as voxel carve processing, for example, as described in "Rapid Octree Construction from Image Sequences" by R. Szeliski in CVGIP: Image Understanding, Volume 58, Number 1, July 1993, pages 23-32 or voxel colouring processing, for example, as described in University of Rochester Computer Sciences Technical Report Number 680 of January 1998 entitled "What Do N Photographs Tell Us About 3D Shape?" and University of Rochester Computer Sciences Technical Report Number 692 of May 1998 entitled "A Theory of Shape by Space Carving", both by Kiriakos N. Kutulakos and Stephen M. Seitz, or silhouette intersection, for example as described in "Looking to Build a Model World: Automatic Construction of Static Object Models Using Computer Vision" by Illingworth and Hilton in IEE Electronics and Communication Engineering Journal, June 1998, pages 103-113.

However, these known methods suffer from a number of problems.

For example, the inventor in the present case has found that the generation of 3D computer models using these techniques can be inaccurate and inflexible.

Accordingly, it is an object of the present invention to address at least one of these problems.

The inventor of the present invention has recognised that the problem of inaccuracies in 3D computer models are caused by a number of factors.

More particularly, shadows are often cast on the surface on which the subject object is placed for imaging (for example, the ground, a table, or a calibration object) which appear to connect to the bottom of the subject object. Accordingly, when processing recorded images, the processing apparatus cannot distinguish between the subject object and shadow, and the shadows are therefore determined to be part of the subject object, resulting in an inaccurate 3D computer model of the subject object.

Further, features on the surface on which the subject object is placed for imaging (such as marks on a floor or table, or features in the pattern on the calibration object) often touch the subject object in a recorded image, and are therefore determined by the processing apparatus to be part of the subject object, again resulting in an inaccurate 3D computer model of the subject object.

In terms of solutions, the inventor has recognised that the problem of shadows could be addressed by using diffuse illumination which is symmetrical about the subject object. However, this is very difficult to achieve in practice.

The inventor of the present invention has further recognised that it is sometimes desirable to generate a 3D computer model of a subset of a plurality of subject objects which are not physically separated in real life or to generate a 3D computer model of part of a subject object, and that the techniques described above to generate a 3D computer model are inflexible when applied in these situations. This is because, with the techniques described above an overall 3D computer model must first be generated before subsequent modification to remove the portions modelling the unwanted object(s) and/or part(s), with the result that the modification can be difficult and/or time consuming.

It is an object of the resent invention to address one or more of the problems above.

According to the present invention, there is provided an image processing apparatus and method in which images of a subject object are processed to determine which pixels relate to the subject object and which pixels do not, thereby producing image segmentations which are displayed to the user and amended in accordance with signals input by the user. The image segmentations, including any amendments thereof, are processed using data defining the positions and orientations at which the images were recorded to generate a three-dimensional computer model of the subject object.

By providing a facility for the user to edit image data segmentations, the user is provided with greater flexibility in the selection of lighting conditions and greater flexibility in the selection of the surface on which to place the subject object for imaging, because pixels relating to shadows, surface features etc can be removed from the subject object outline.

In addition, the user can edit the image data segmentations to remove parts relating to unwanted objects or relating to unwanted parts of a single subject. In this very way, when the 3D computer model is generated, it does not include the unwanted objects or parts.

The present invention also provides a computer program product for configuring a programmable apparatus to operate in the way described above.

An embodiment of the invention will now be described, by way of example only, with reference to the accompanying drawings. Although the embodiment described below relates to the processing of images of a subject object together with a calibration object to calculate the positions and orientations of the input images and to generate a three-dimensional computer model of the subject object, the present invention is not limited to this. Instead, the invention is also applicable to the processing of images of the subject object alone for 3D modelling since, as described above, the calibration object is not necessary to calculate the positions and orientations at which the input images were recorded. In the drawings:

FIG. 1 schematically shows the components of an embodiment of the invention, together with the notional functional processing units into which the processing apparatus component may be thought of as being configured when programmed by programming instructions;

FIG. 9 illustrates an example of the display on the display device of FIG. 1 during processing at step S8-2 and step S8-4 in FIG. 8.

Figure 1:
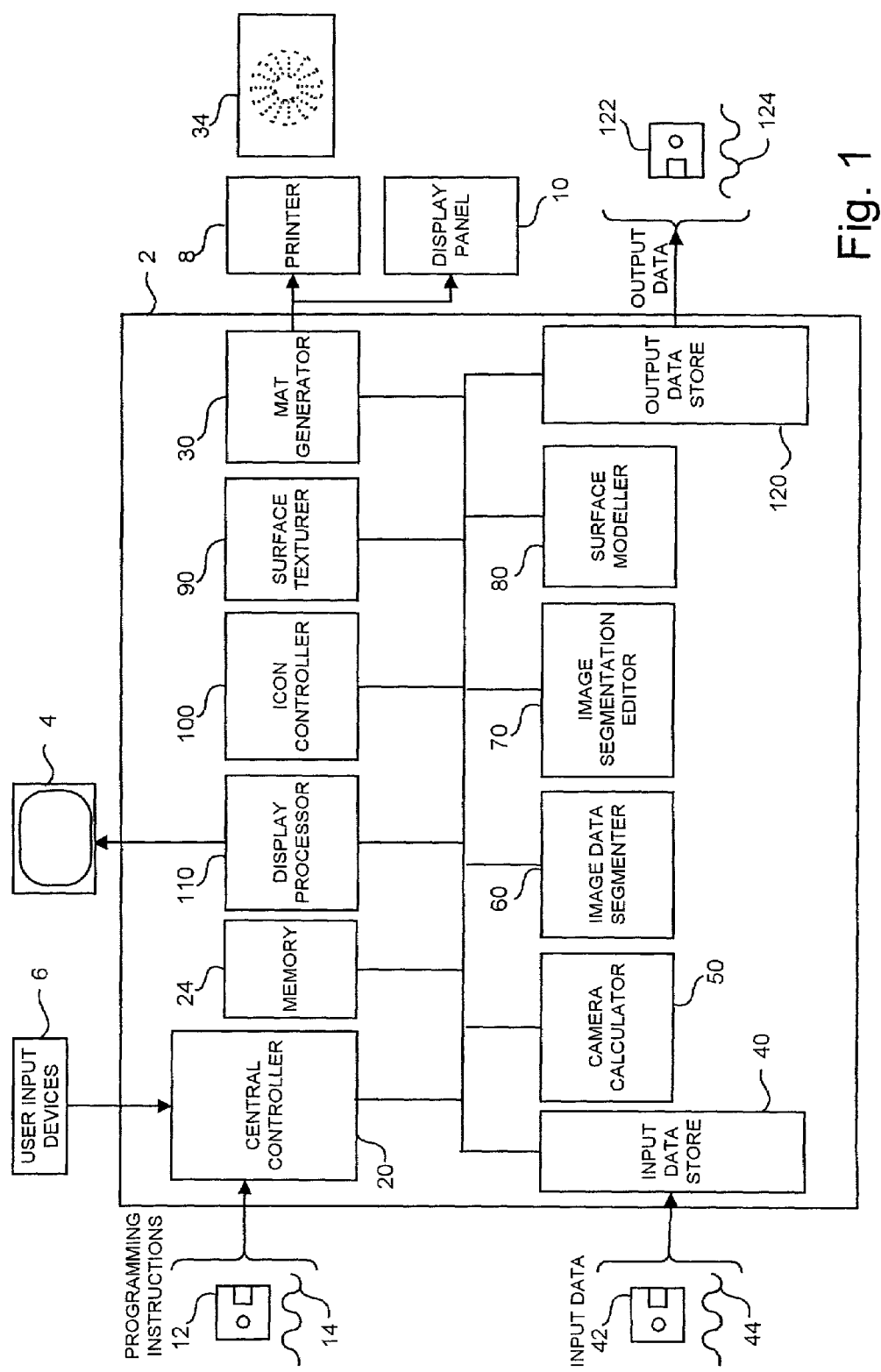

Referring to FIG. 1, an embodiment of the invention comprises a processing apparatus 2, such as a personal computer, containing, in a conventional manner, one or more processors, memories, graphics cards etc, together with a display device 4, such as a conventional personal computer monitor, user input devices 6, such as a keyboard, mouse etc, a printer 8, and a display panel 10 comprising a flat panel having controllable pixels, such as the PL400 manufactured by WACOM.

The processing apparatus 2 is programmed to operate in accordance with programming instructions input, for example, as data stored on a data storage medium, such as disk 12, and/or as a signal 14 input to the processing apparatus 2, for example form a remote database, by transmission over a communication network (not shown) such as the Internet or by transmission through the atmosphere, and/or entered by a user via a user input device 6 such as a keyboard.

As will be described in more detail below, the programming instructions comprise instructions to cause the processing apparatus 2 to become configured to process input data defining a plurality of images of one or more subject objects recorded at different positions and orientations to calculate the positions and orientations at which the input images were recorded and to use the calculated positions and orientations to generate data defining a three-dimensional computer model of the subject object(s). In this embodiment, the subject object(s) is imaged on a calibration object (a two-dimensional photographic mat in this embodiment) which has a known pattern of features thereon, and the positions and orientations at which the input images were recorded are calculated by detecting the positions of the features of the calibration object pattern in the images. The 3D computer model of the subject object(s) is generated using a conventional voxel carving technique. As a preliminary step to generating the 3D computer model, each image of the subject object(s) is processed to segment image data relating to the subject object from other image data (background image data). For each input image to be processed, an icon is displayed to the user on the display of display device 4. In this embodiment, each icon comprises a "thumb nail" image of the input image (that is, a reduced pixel version of the input image). As segmentation processing proceeds, the displayed icon for an input image is changed as processing of that input image proceeds. In this embodiment, the icon is changed to show the result of the segmentation processing. In addition, processing apparatus 2 allows the user to edit the results of the segmentation processing, if necessary, the processing result can then be edited by the user. In this way, the displayed thumb nail images show the status of the processing at two different levels, namely the status of the processing on an individual input image and the status of the overall processing on all input images (in terms of the processing that has been carried out and the processing that remains to be carried out). In addition, the use of thumb nail images to display processing progress also provides particular advantages in the case of small display screens since a progress indicator separate to the displayed input images (which provide the image selection and editing advantages mentioned above) is not necessary.

When programmed by the programming instructions, processing apparatus 2 can be thought of as being configured as a number of functional units for performing processing operations. Examples of such functional units and their interconnections are shown in FIG. 1. The units and interconnections illustrated in FIG. 1 are, however, notional and are shown for illustration purposes only to assist understanding; they do not necessarily represent units and connections into which the processor, memory etc of the processing apparatus 2 become configured.

Referring to the functional units shown in FIG. 1, a central controller 20 processes inputs from the user input devices 6, and also provides control and processing for the other functional units. Memory 24 is provided for use by central controller 20 and the other functional units.

Mat generator 30 generates control signals to control printer 8 or display panel 10 to print a photographic mat 34 on a recording medium such as a piece of paper, or to display the photographic mat on display panel 10. As will be described in more detail below, the photographic mat comprises a predetermined pattern of features and the object(s) for which a three-dimensional computer model is to be generated is placed on the printed photographic mat 34 or on the display panel 10 on which the photographic mat is displayed. Images of the object and the photographic mat are then recorded and input to the processing apparatus 2. Mat generator 30 stores data defining the pattern of features printed or displayed on the photographic mat for use by the processing apparatus 2 in calculating the positions and orientations at which the input images were recorded. More particularly, mat generator 30 stores data defining the pattern of features together with a coordinate system relative to the pattern of features (which, in effect, defines a reference position and orientation of the photographic mat), and processing apparatus 2 calculates the positions and orientations at which the input images were recorded in the defined coordinate system (and thus relative to the reference position and orientation).

In this embodiment, the pattern on the photographic mat comprises spatial clusters of features for example as described in co-pending PCT patent application GB00/04469 (WO-A-01/39124) (the full contents of which are incorporated herein by cross-reference) or any known pattern of features, such as a pattern of coloured dots, with each dot having a different hue/brightness combination so that each respective dot is unique, for example as described in JP-A-9-170914, a pattern of concentric circles connected by radial line segments with known dimensions and position markers in each quadrant, for example as described in "Automatic Reconstruction of 3D Objects Using A Mobile Camera" by Niem in Image and Vision Computing 17 (1999) pages 125-134, or a pattern comprising concentric rings with different diameters, for example as described in "The Lumigraph" by Gortler et al in Computer Graphics Proceedings, Annual Conference Series, 1996 ACM-0-89791-764-4/96/008.

In the remainder of the description, it will be assumed that the pattern is printed by printer 8 on a recording medium (in this embodiment, a sheet of paper) to generate a printed photographic mat 34, although, as mentioned above, the pattern could be displayed on display panel 10 instead.

Input data store 40 stores input data input to the processing apparatus 2 for example as data stored on a storage device, such as disk 42, as a signal 44 transmitted to the processing apparatus 2, or using a user input device 6. The input data defines a plurality of images of one or more subject objects on the photographic mat recorded at different positions and orientations, and an input image showing the background against which the object(s) was imaged together with part of the photographic mat to show the background colour thereof or a different object having the same colour as the background colour of the mat. In addition, in this embodiment, the input data also includes data defining the intrinsic parameters of the camera which recorded the images, that is, the aspect ratio, focal length, principal point (the point at which the optical axis intersects the imaging plane), first order radial distortion coefficient, and skew angle (the angle between the axes of the pixel grid; because the axes may not be exactly orthogonal).

The input data defining the input images may be generated for example by downloading pixel data from a digital camera which recorded the images, or by scanning photographs using a scanner (not shown). The input data defining the intrinsic camera parameters may be input by a user using a user input device 6.

Camera calculator 50 processes each input image to detect the positions in the image of the features on the photographic mat and to calculate the position and orientation of the camera when the input image was recorded.

Image data segmenter 60 processes each input image to separate image data corresponding to the subject object from other image data in the image.

Image segmentation editor 70 is operable, under user control, to edit the segmented image data generated by image data segmenter 60. As will be explained in more detail below, this allows the user to correct an image segmentation produced by image data segmenter 60, and in particular for example to correct pixels mistakenly determined by image data segmenter 60 to relate to the subject object 210 (for example pixels relating to marks or other features visible on the surface on which the photographic mat 34 and subject object are placed for imaging, pixels relating to shadows on the photographic mat 34 and/or surface on which it is placed and pixels relating to a feature on the photographic mat 34 which touches the outline of the subject object in the input image have all been found to be mistakenly classified during image data segmentation and to lead to inaccuracies in the resulting 3D computer model if not corrected).

Surface modeller 80 processes the segmented image data produced by image data segmenter 60 and image segmentation editor 70 and the data defining the positions and orientations at which the images were recorded generated by camera calculator 50, to generate data defining a 3D computer model representing the actual surfaces of the object(s) in the input images.

Surface texturer 90 generates texture data from the input image data for rendering onto the surface model produced by surface modeller 80.

Icon controller 100 controls the display on display device 4 of icons representing the input images and the processing performed thereon, so that the user can see the input images to be processed and the progress of processing performed by processing apparatus 2, and also so that the user can see the results of processing and select any results for editing if necessary.

Display processor 110, under the control of central controller 20, displays instructions to a user via display device 4. In addition, under the control of central controller 20, display processor 110 also displays images of the 3D computer model of the object from a user-selected viewpoint by processing the surface model data generated by surface modeller 80 and rendering texture data produced by surface texturer 90 onto the surface model.

Output data store 120 stores the camera positions and orientations calculated by camera calculator 50 for each input image, the image data relating to the subject object from each input image generated by image data segmenter 60 and image segmentation editor 70, and also the surface model and the texture data therefor generated by surface modeller 80 and surface texturer 90. Central controller 20 controls the output of data from output data store 120, for example as data on a storage device, such as disk 122, and/or as a signal 124.

Figure 2:
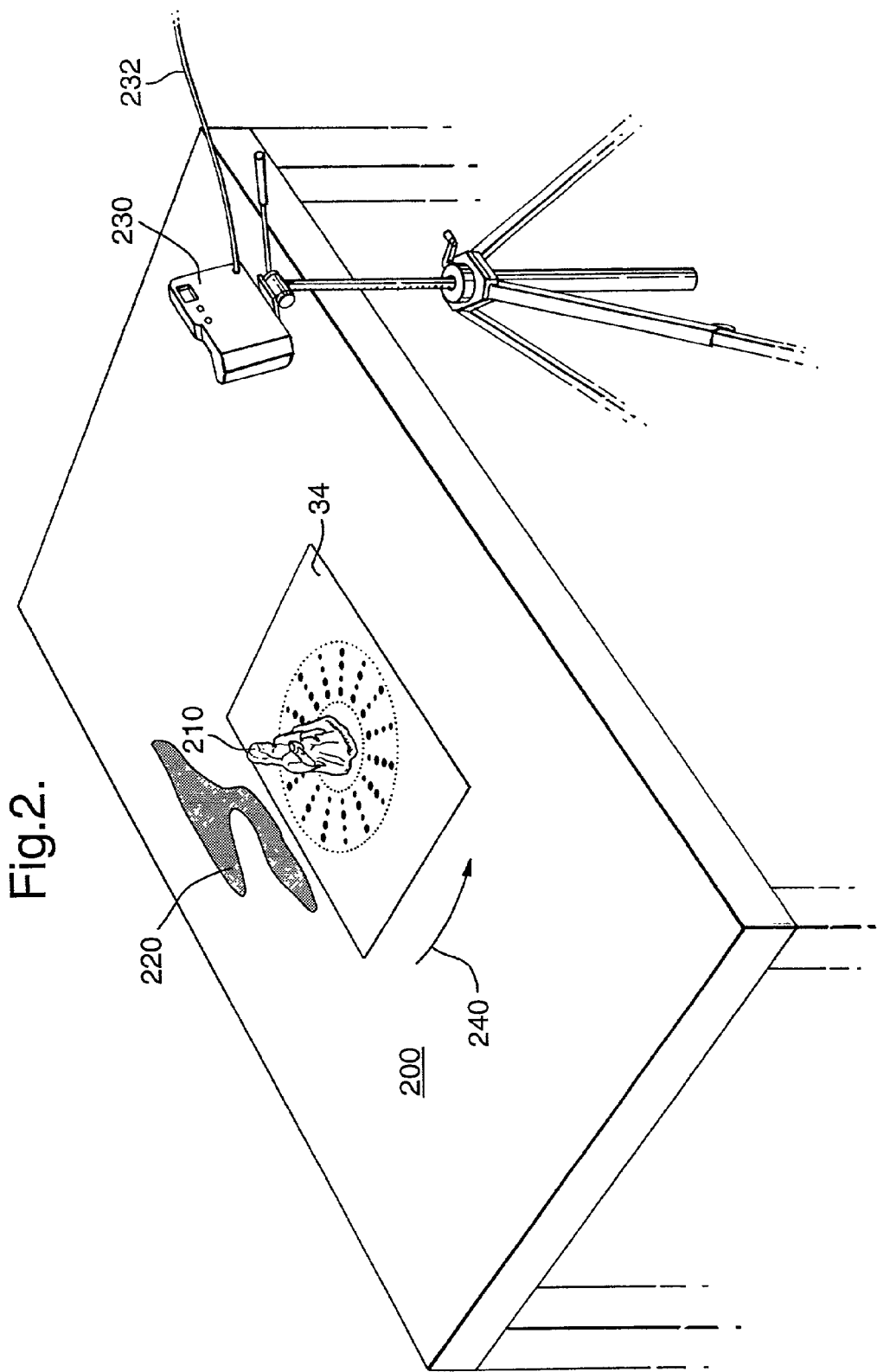
FIG. 2 illustrates the recording of images of an object for which a 3D computer model is to be generated.

Referring to FIG. 2, the printed photographic mat 34 is placed on a surface 200, and the subject object 210 for which a 3D computer model is to be generated is placed on the photographic mat 34 so that the object 210 is surrounded by the features making up the pattern on the mat.

Preferably, the surface 200 is of a substantially uniform colour, which, if possible, is different to any colour in the subject object 210 so that, in input images, image data relating to the subject object 210 can be accurately distinguished from other image data during segmentation processing by image data segmenter 60. However, if this is not the case, for example if a mark 220 having a colour the same as the colour in the subject object 210 appears on the surface 200 (and hence in input images), processing can be performed in this embodiment to accommodate this by allowing the user to edit segmentation data produced by image data segmenter 60, as will be described in more detail below.

Images of the object 210 and photographic mat 34 are recorded at different positions and orientations to show different parts of object 210 using a digital camera 230. In this embodiment, data defining the images recorded by camera 230 is input to processing apparatus 2 as a signal 44 along wire 232.

More particularly, in this embodiment, camera 230 remains in a fixed position and photographic mat 34 with object 210 thereon is moved (translated) and rotated (for example in the direction of arrow 240) on surface 200, and photographs of the object 210 at different positions and orientations relative to the camera 230 are recorded. During the rotation and translation of the photographic mat 34 on surface 200, the object 210 does not move relative to the mat 34.

Figure 3:
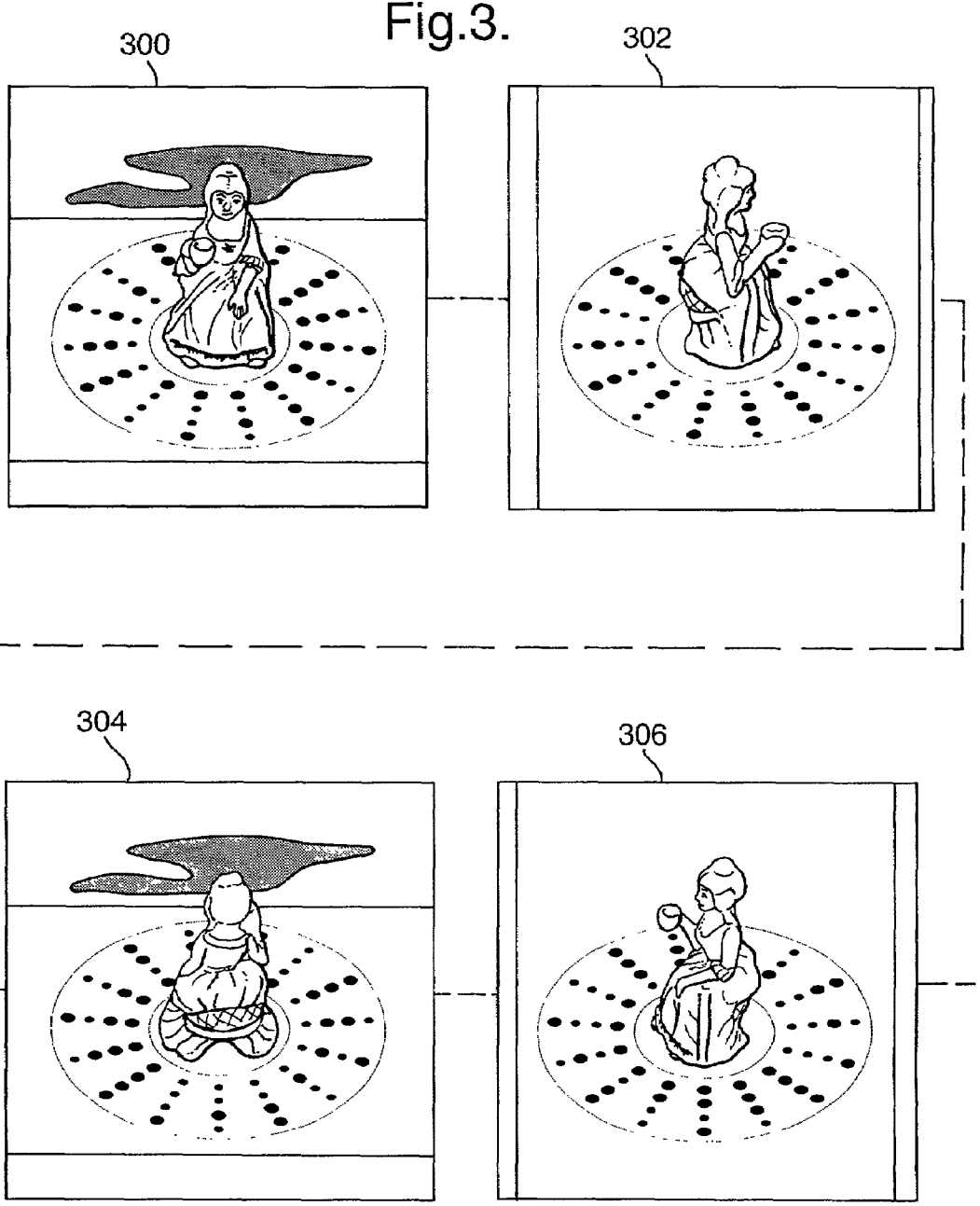
FIG. 3 illustrates images of the object which are input to the processing apparatus in FIG. 1.

FIG. 3 shows examples of images 300, 302, 304 and 306 defined in data input to processing apparatus 2 of the object 210 and photographic mat 34 in different positions and orientations relative to camera 230.

In this embodiment, following the recording and input of images of object 210 and photographic mat 34, a further image is recorded and input to processing apparatus 2. This further image comprises a "background image", which is an image of the surface 200 and an object having the same colour as the paper on which photographic mat 34 is printed. Such a background image may be recorded by placing a blank sheet of paper having the same colour as the sheet on which photographic mat 34 is recorded on surface 200, or by turning the photographic mat 34 over on surface 200 so that the pattern thereon is not visible in the image.

Figure 4:
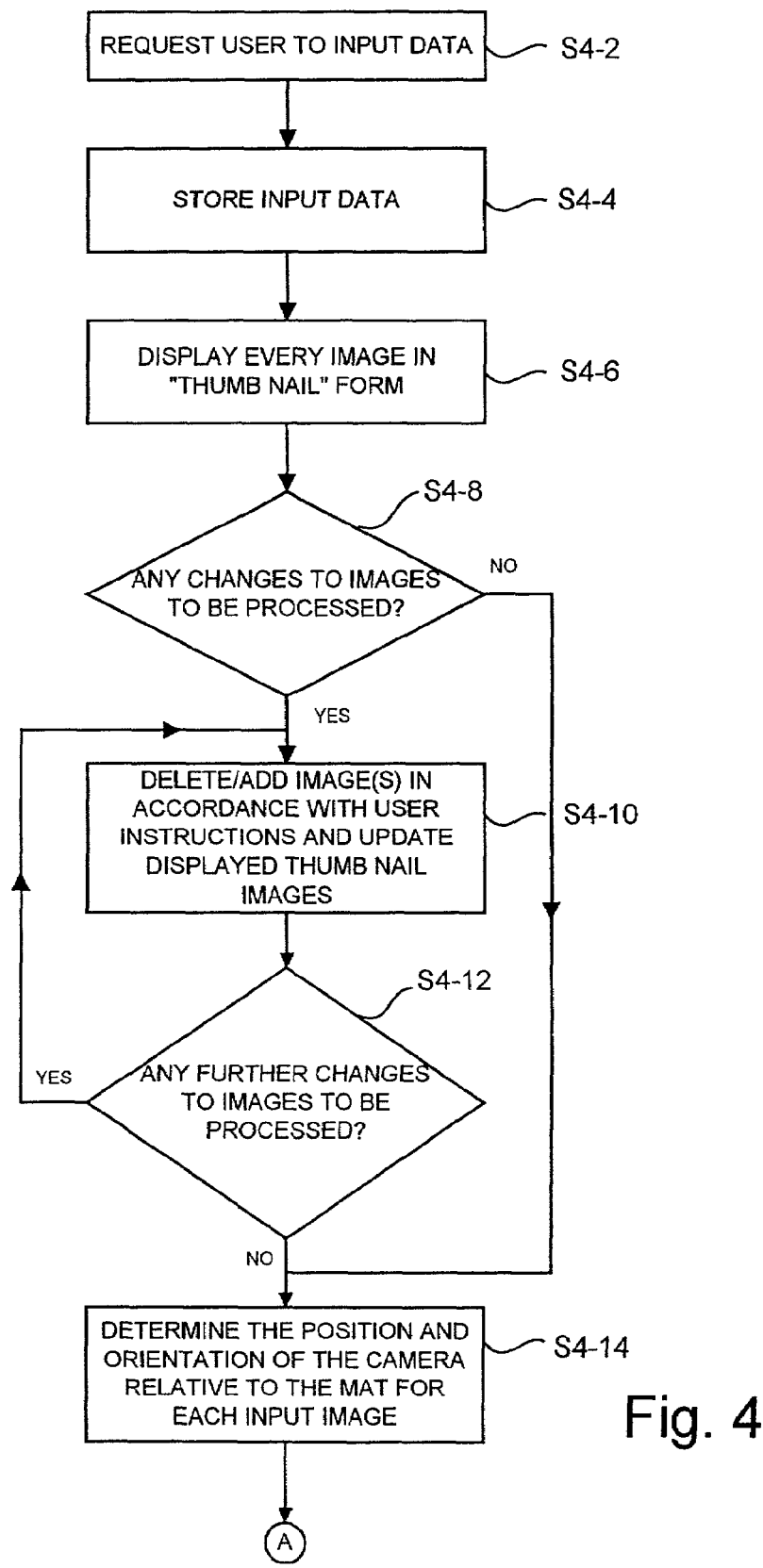
FIG. 4 shows the processing operations performed by the processing apparatus in FIG. 1 to process input data.
Figure 4:
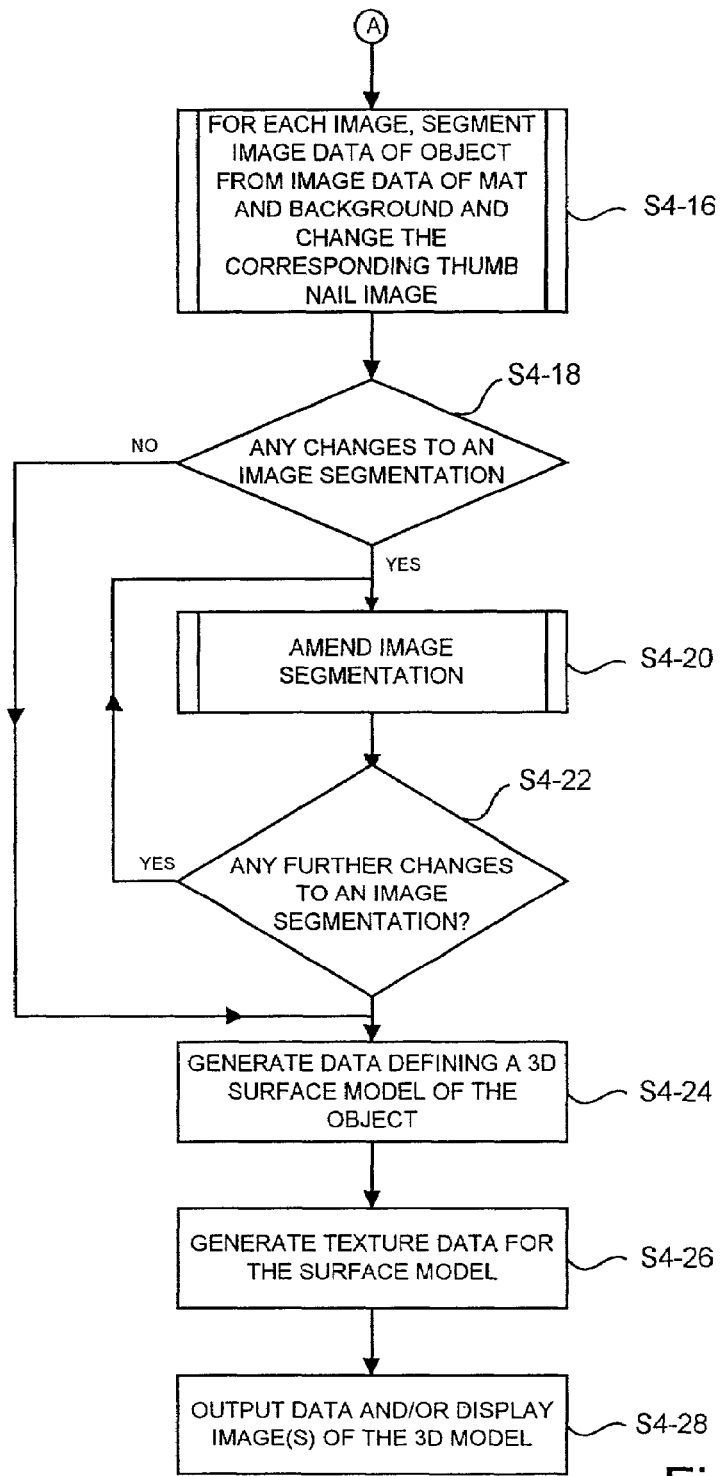

FIG. 4 shows the processing operations performed by processing apparatus 2 to process input data in this embodiment.

Referring to FIG. 4, at step S4-2, central controller 20 causes display processor 110 to display a message on display device 4 requesting the user to input data for processing.

At step S4-4, data input by the user in response to the request at step S4-2 is stored in the input data store 40. More particularly, in this embodiment, the input data comprises image data defining the images of the object 210 and mat 34 recorded at different positions and orientations relative to the camera 230, the "background image" showing the surface 200 on which photographic mat 34 was placed to record the input images together with an object having the same colour as the recording material on which the pattern of photographic mat 34 is printed, and data defining the intrinsic parameters of the camera 230 which recorded the input images, that is the aspect ratio, focal length, principal point (the point at which the optical axis intersects the imaging plane), the first order radial distortion coefficient, and the skew angle (the angle between the axes of the pixel grid).

Figure 5:
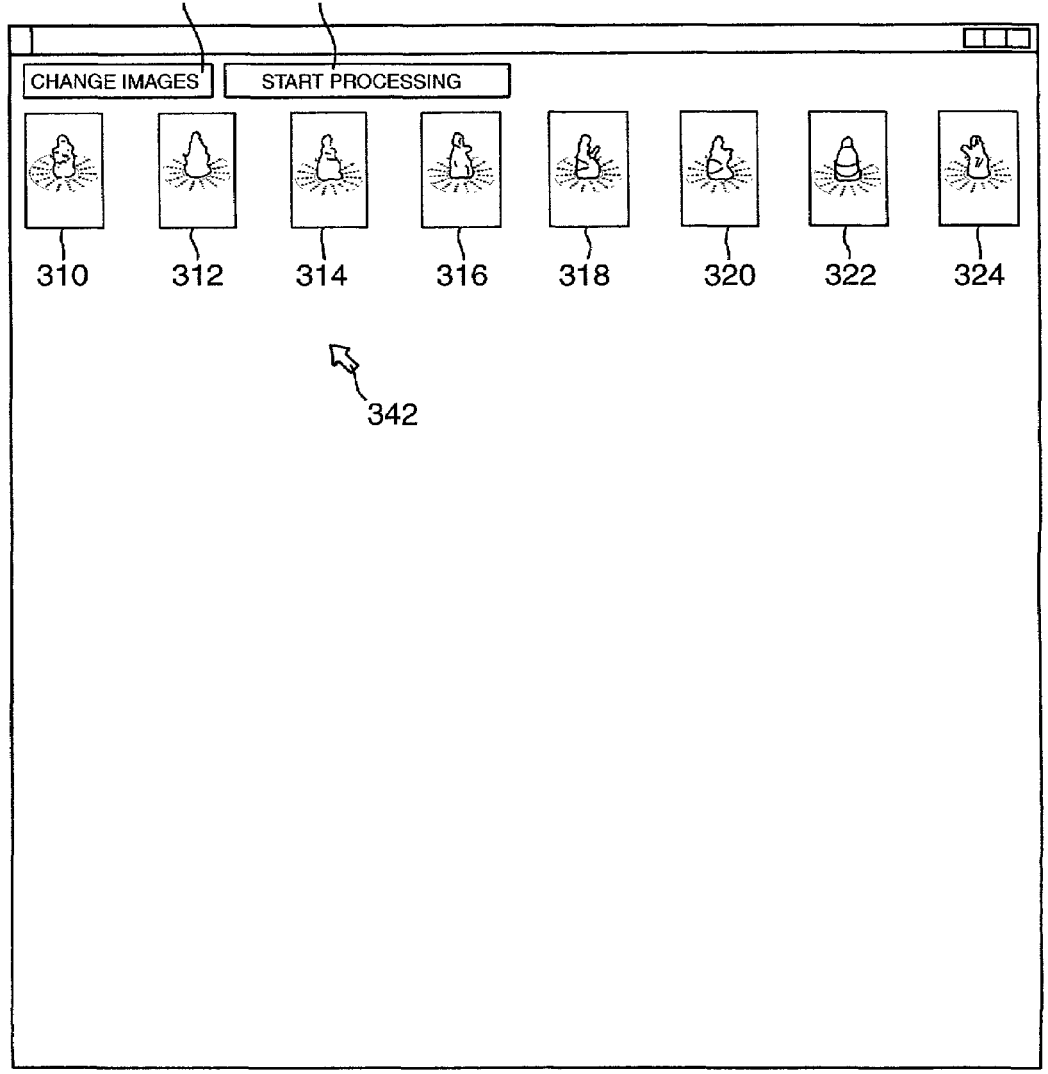
FIG. 5 shows the display of each input image in "thumb nail" (reduced pixel) form at step S4-6 in FIG. 4.

At step S4-6, icon controller 100 causes display processor 110 to display on display device 4 a respective icon for each input image of the subject object 210 stored at step 4-4. More particularly, referring to FIG. 5, in this embodiment, each icon 310-324 comprises a reduced resolution version (a "thumb nail" image) of the corresponding input image, thereby enabling the user to see whether the input images to be processed are the correct ones (for example that all of the images are of the same subject object and that none are of a different subject object) and that the input images are suitable for processing (for example that there are sufficient input images in different positions and orientations so that each part of the subject object is visible in at least one image, and that the whole outline of the object is visible in each input image—that is, part of the object does not protrude out of a side of an input image). Each thumb nail image is generated in a conventional manner. That is, to generate a thumb nail input image, the corresponding input image is either sub-sampled (so as to take one pixel from each set containing a predetermined number of adjacent pixels, rejecting the other pixels in the set so that they are not displayed in the thumb nail image), or the corresponding input image is processed to calculate a value for each pixel in the thumb nail image by averaging the values of a predetermined number of adjacent pixels in the input image.

Referring again to FIG. 4, at step S4-8, central controller 20 determines whether the user has input signals to processing apparatus 2 indicating that one or more of the input images is to be changed by pointing and clicking on the "change images" button 340 displayed on display device 4 (FIG. 5) using cursor 342 and a user input device 6 such as a mouse.

If it is determined at step S4-8 that the user wishes to change one or more images, then, at step S4-10, central controller 20, acting under control of user instructions input using a user input device 6, deletes and/or adds images in accordance with the users instructions. To add an image, the user is requested to enter image data defining the input image, and the data entered by the user is stored in input data store 40. To delete an image, the user points and clicks on the displayed icon 310-324 corresponding to the input image to be deleted and presses the "delete" key on the keyboard user input device 6. After an image has been added or deleted, icon controller 100 causes display processor 110 to update the displayed thumb nail images 310-324 on display device 4 so that the user is able to see the input images to be processed.

At step S4-12, central controller 20 determines whether any further changes are to be made to the images to be processed. Steps S4-10 and S4-12 are repeated until no further changes are to be made to the input images.

When it is determined at step S4-8 or S4-12 that no changes are to be made to the input images (indicated by the user pointing and clicking on the "start processing" button 344 displayed on display device 4), the processing proceeds to step S4-14. The thumb nail images 310-324 remain displayed throughout the remainder of the processing, but are changed as the processing proceeds and in response to certain user inputs, as will be described below.

At step S4-14, camera calculator 50 processes the input data stored at step S4-4 and amended at step S4-10 to determine the position and orientation of the camera 230 relative to the photographic mat 34 (and hence relative to the object 210) for each input image. This processing comprises, for each input image, detecting the features in the image which make up the pattern on the photographic mat 34 and comparing the features to the stored pattern for the photographic mat to determine the position and orientation of the camera 230 relative to the mat. The processing performed by camera calculator 50 at step S4-14 depends upon the pattern of features used on the photographic mat 34. Accordingly, suitable processing is described, for example, in co-pending PCT patent application GB00/04469 (WO-A-01/39124), JP-A-9-170914, "Automatic Reconstruction of 3D Objects Using A Mobile Camera" by Niem in Image and Vision Computing 17 (1999) pages 125-134 and "The Lumigraph" by Gortler et al in Computer Graphics Proceedings, Annual Conference Series, 1996 ACM-0-89791-764-4/96/008.

At step S4-16, image data segmenter 60 processes each input image to segment image data representing the object 210 from image data representing the photographic mat 34 and the surface 200 on which the mat 34 is placed (step S4-16 being a preliminary step in this embodiment to generate data for use in the subsequent generation of a 3D computer model of the surface of object 210, as will be described in more detail below).

Figure 6:
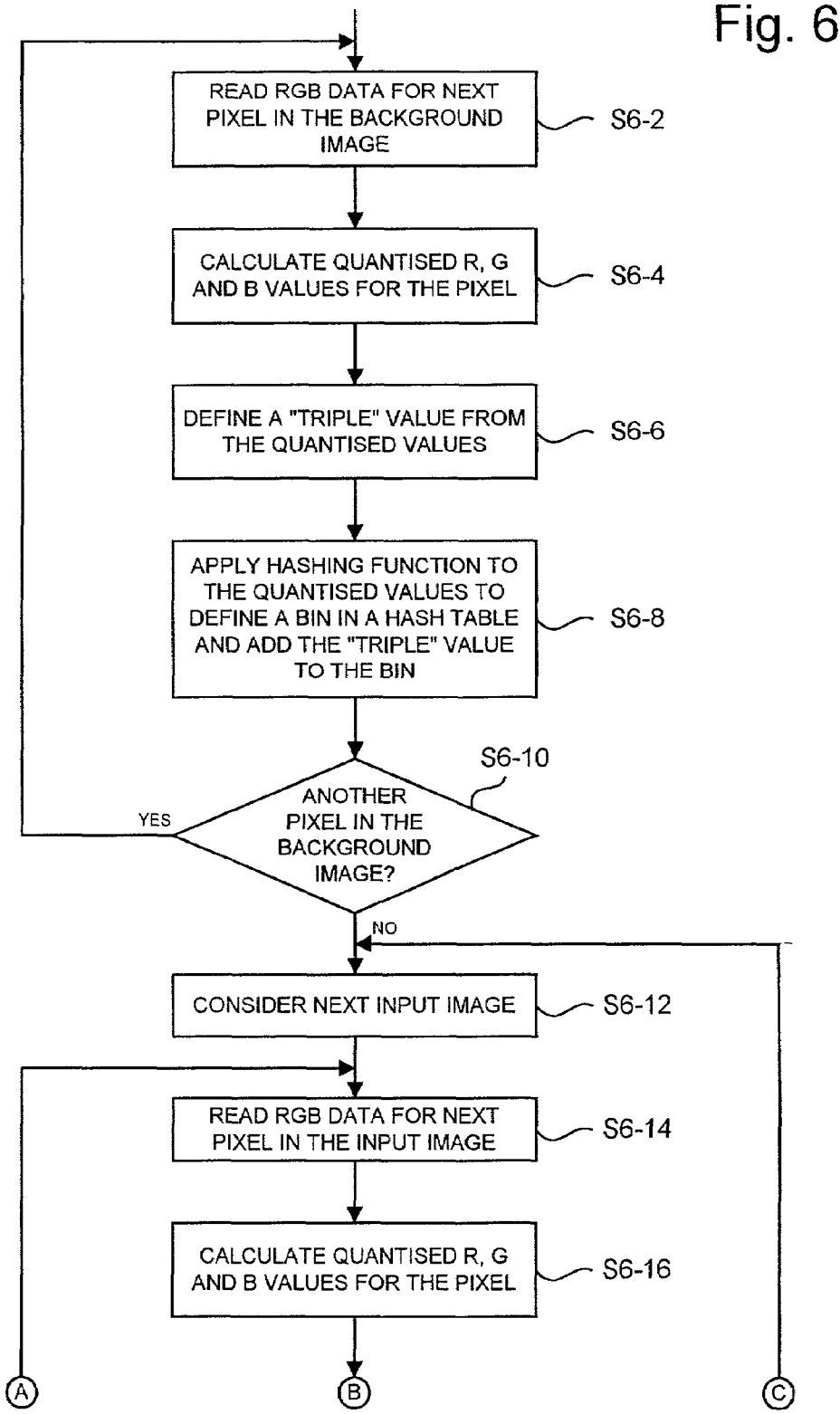
FIG. 6 shows the processing operations performed at step S4-16 in FIG. 4.
Figure 6:
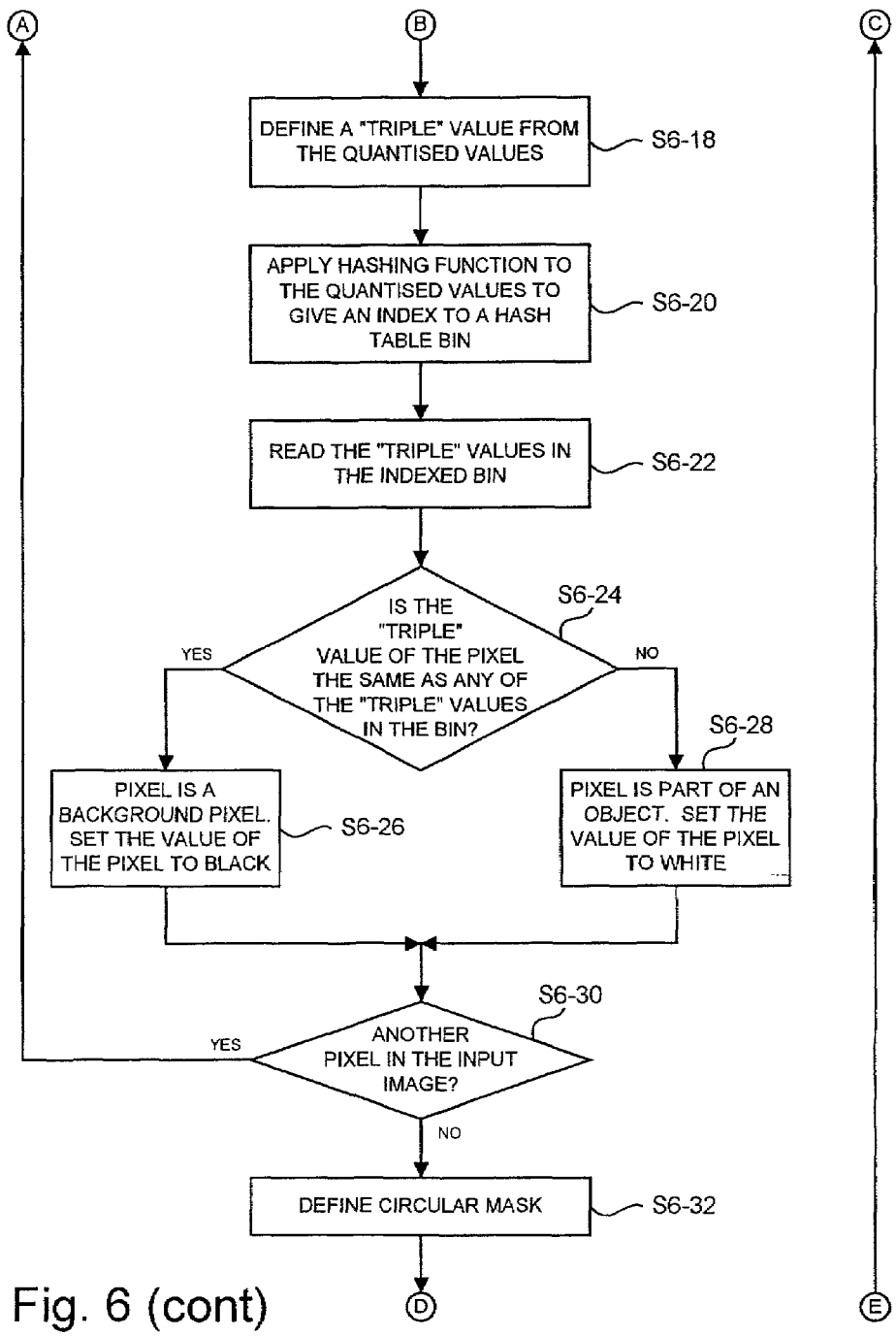
Figure 6:
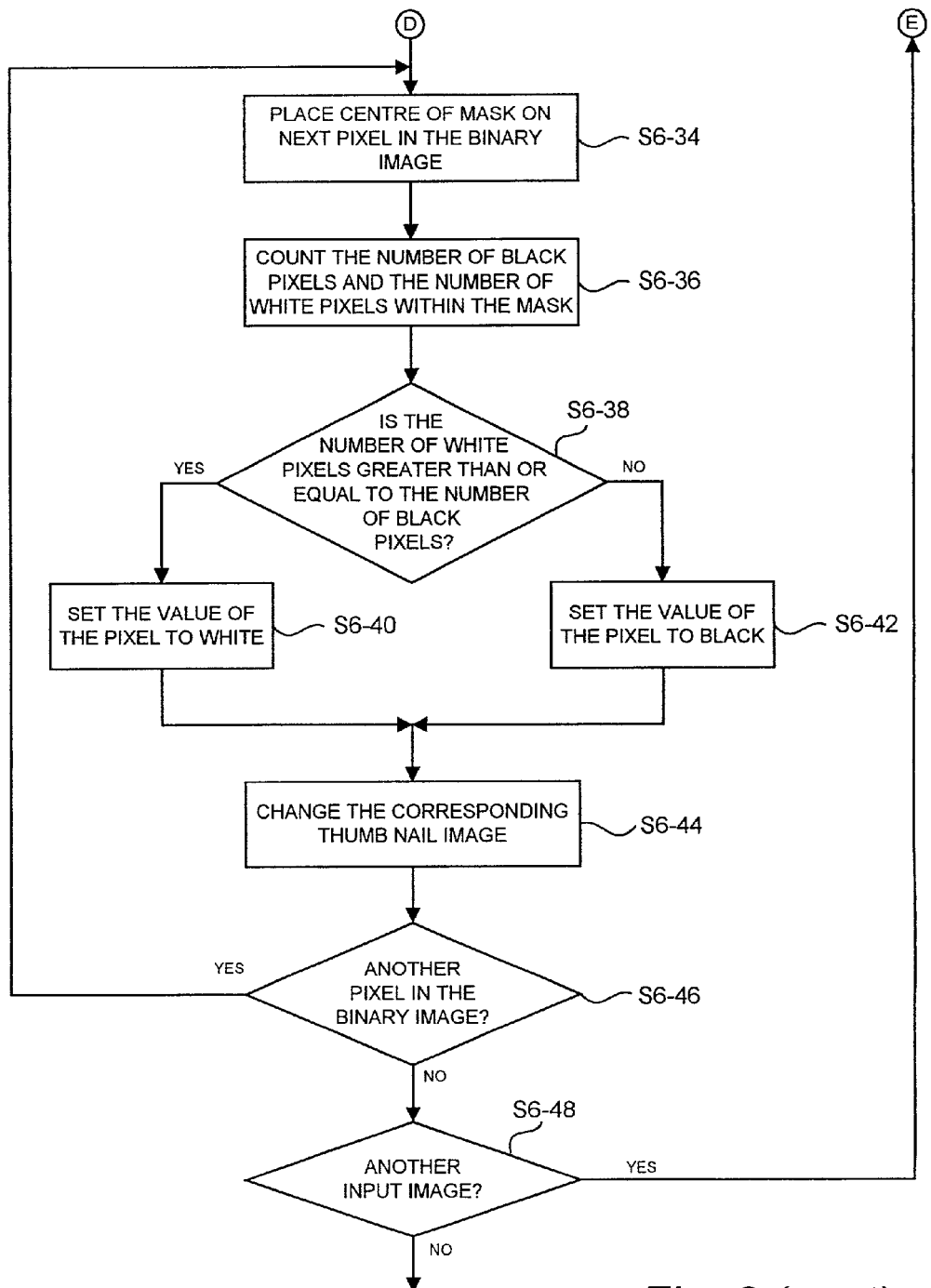

FIG. 6 shows the processing operations performed by image data segmenter 60 at step S4-16.

Referring to FIG. 6, at steps S6-2 to S6-10, image data segmenter 60 builds a hash table of quantised values representing the colours in the input images which represent the photographic mat 34 and the background 200 but not the object 210 itself.

More particularly, at step S6-2, image data segmenter 60 reads the RBG data values for the next pixel in the "background image" stored at step S4-4 in FIG. 4 (that is, the final image to be input to processing apparatus 2 which shows the surface 200 and an object having the same colour as the material on which photographic mat 34 is printed).

At step S6-4, image data segmenter 60 calculates a quantised red (R) value, a quantised green (G) and a quantised blue (B) value for the pixel in accordance with the following equation:

$$q = \frac{(p + t/2)}{t} \quad (1)$$

where:
"q" is the quantised value;
"p" is the R, G or B value read at step S6-2;
"t" is a threshold value determining how near RGB values from an input image showing the object 210 need to be to background colours to be labelled as background. In this embodiment, "t" is set to 4.

At step S6-6, image data segmenter 60 combines the quantised R, G and B values calculated at step S6-4 into a "triple value" in a conventional manner.

At step S6-8, image data segmenter 60 applies a hashing function to the quantised R, G and B values calculated at step S6-4 to define a bin in a hash table, and adds the "triple" value defined at step S6-6 to the defined bin. More particularly, in this embodiment, image data segmenter 60 applies the following hashing function to the quantised R, G and B values to define the bin in the hash table:

$$h(q) = (q_{red} \& 7) * 2^6 + (q_{green} \& 7) * 2^3 + (q_{blue} \& 7) \quad (2)$$

That is, the bin in the hash table is defined by the three least significant bits of each colour. This function is chosen to try and spread out the data into the available bins in the hash table, so that each bin has only a small number of "triple" values. In this embodiment, at step S6-8, the "triple" value is added to the bin only if it does not already exist therein, so that each "triple" value is added only once to the hash table.

At step S6-10, image data segmenter 60 determines whether there is another pixel in the background image. Steps S6-2 to S6-10 are repeated until each pixel in the "background" image has been processed in the manner described above. As a result of this processing, a hash table is generated containing values representing the colours in the "background" image.

At steps S6-12 to S6-48, image data segmenter 60 considers each input image in turn and uses the hash table to segment the data in the input image relating to the photographic mat 34 and background from the data in the input image relating to the object 210. While the segmentation processing is being performed for an input image, the corresponding icon 310-324 displayed on display device 4 is changed so that the user can monitor the progress of the processing for each individual input image (by looking at the corresponding icon) and the processing progress overall (by looking at the number of images for which segmentation has been performed and the number for which segmentation remains to be performed).

In this embodiment, the "background" image processed at steps S6-2 to S6-10 to generate the hash table does not show the features on the photographic mat 34. Accordingly, the segmentation performed at steps S6-12 to S6-48 does not distinguish pixel data relating to the object 210 from pixel data relating to a feature on the mat 34. Instead, in this embodiment, the processing performed by surface modeller 80 to generate the 3D computer model of the surface of object 210 is carried out in such a way that pixels relating to a feature on photographic mat 34 do not contribute to the surface model, as will be described in more detail below.

At step S6-12, image data segmenter 60 considers the next input image, and at step S6-14 reads the R, G and B values for the next pixel in the input image (this being the first pixel the first time step S6-14 is performed).

At step S6-16, image data segmenter 60 calculates a quantised R value, a quantised G value and a quantised B value for the pixel using equation (1) above.

At step S6-18, image data segmenter 60 combines the quantised R, G and B values calculated at step S6-16 into a "triple value".

At step S6-20, image data segmenter 60 applies a hashing function in accordance with equation (2) above to the quantised values calculated at step S6-16 to define a bin in the hash table generated at steps S6-2 to S6-10.

At step S6-22, image data segmenter 60 reads the "triple" values in the hash table bin defined at step S6-20, these "triple" values representing the colours of the material of the photographic mat 34 and the background surface 200.

At step S6-24, image data segmenter 60 determines whether the "triple" value generated at step S6-18 of the pixel in the input image currently being considered is the same as any of the background "triple" values in the hash table bin.

If it is determined at step S6-24 that the "triple" value of the pixel is the same as a background "triple" value, then, at step S6-26, it is determined that the pixel is a background pixel and the value of the pixel is set to "black".

On the other hand, if it is determined at step S6-24 that the "triple" value of the pixel is not the same as any "triple" value of the background, then, at step S6-28, it is determined that the pixel is part of the object 210 and image data segmenter 60 sets the value of the pixel to "white".

At step S6-30, image data segmenter 60 determines whether there is another pixel in the input image. Steps S6-14 to S6-30 are repeated until each pixel in the input image has been processed in the manner described above.

At steps S6-32 to S6-46, image data segmenter 60 performs processing to correct any errors in the classification of image pixels as background pixels or object pixels, and to update the corresponding thumb nail image to show the current status of the segmentation processing.

More particularly, at step S6-32, image data segmenter 60 defines a circular mask for use as a median filter. In this embodiment, the circular mask has a radius of 4 pixels.

At step S6-34, image data segmenter 60 performs processing to place the centre of the mask defined at step S6-32 at the centre of the next pixel in the binary image generated at steps S6-26 and S6-28 (this being the first pixel the first time step S6-34 is performed).

At step S6-36, image data segmenter 60 counts the number of black pixels and the number of white pixels within the mask.

At step S6-38, image data segmenter 60 determines whether the number of white pixels within the mask is greater than or equal to the number of black pixels within the mask.

If it is determined at step S6-38 that the number of white pixels is greater than or equal to the number of black pixels, then, at step S6-40 image data segmenter 60 sets the value of the pixel on which the mask is centred to white. On the other hand, if it is determined at step S6-38 that the number of black pixels is greater than the number of white pixels then, at step S6-42, image data segmenter 60 sets the value of the pixel on which the mask is centred to black.

Figure 7:
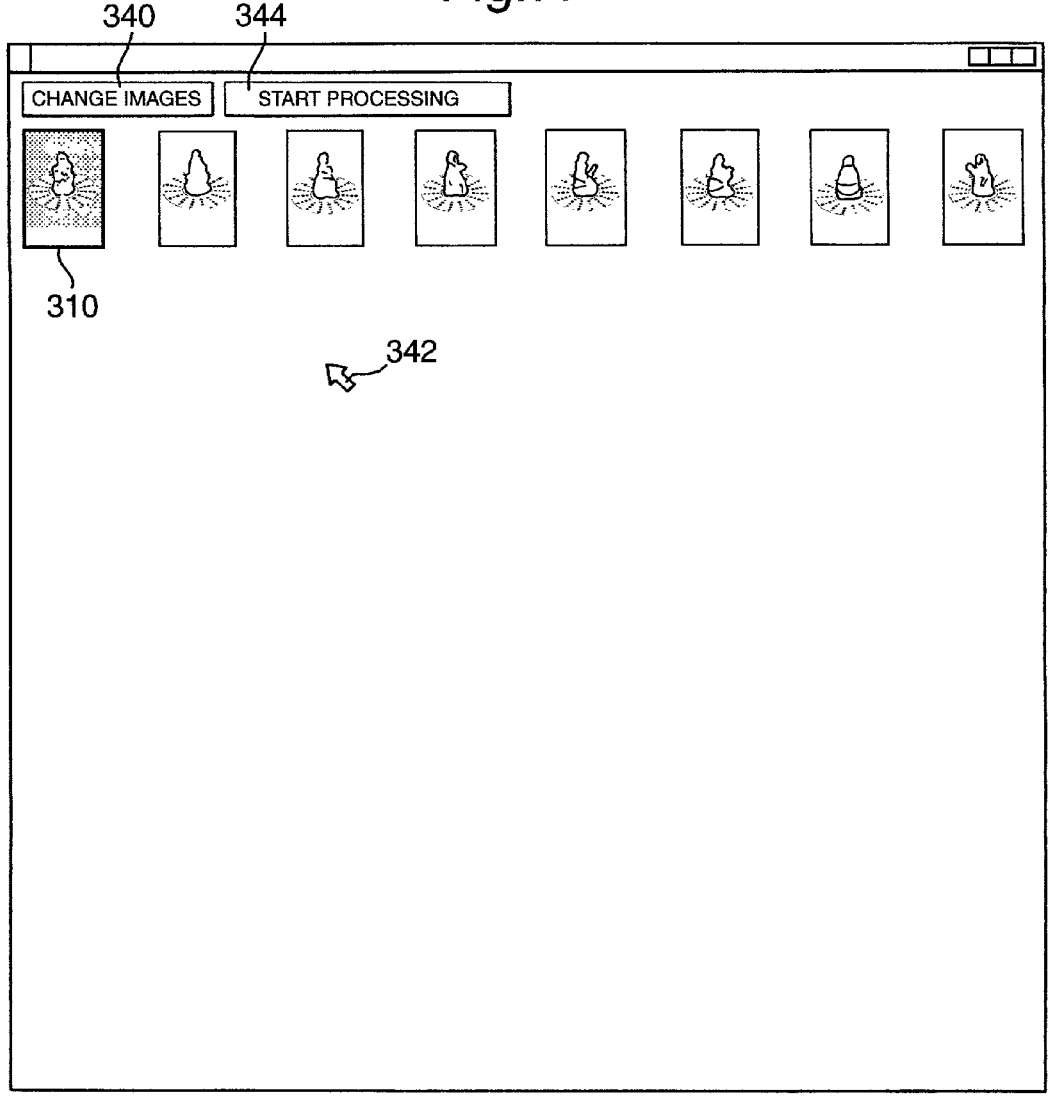
FIG. 7 illustrates how the display of a thumb nail image is changed at step S6-44 in FIG. 6.

At step S6-44, icon controller 100 causes display processor 110 to update the icon displayed on display device 4 for the input image for which segmentation processing is currently being carried out. More particularly, referring to FIG. 7, in this embodiment, the icon corresponding to the image for which segmentation is being performed (icon 310 in the example of FIG. 7) is changed by icon controller 100 to take account of the result of the segmentation processing previously performed on the pixel at steps S6-34 to S6-42. Thus, icon 310 is updated incrementally as each pixel in the input image is processed. In this embodiment, icon controller 100 causes display processor 110 to change the thumb nail image so that image data in the input image which is determined to represent the background is presented as a predetermined colour, for example blue, in the thumb nail image (represented by the shading in the example of FIG. 7). In FIG. 7, icon 310 is shown for a situation where approximately four fifths of the first input image has been processed, with the bottom part of the input image, represented by the unshaded area of icon 310 in FIG. 7, remaining to be processed.

As a result of changing the icons in this way, not only can the user see which parts of the input image have been processed and also which complete input images remain to be processed, but the user can also see the result of the segmentation processing and hence can determine whether any amendment is necessary.

Referring again to FIG. 6, at step S6-46, image data segmenter 60 determines whether there is another pixel in the binary image, and steps S6-34 to S6-46 are repeated until each pixel has been processed in the manner described above.

At step S6-48, image data segmenter 60 determines whether there is another input image to be processed. Steps S6-12 to S6-48 are repeated until each input image has been processed in the manner described above.

Referring again to FIG. 4, at step S4-18, central controller 20 determines whether a signal has been received from a user via a user input device 6 indicating that the user wishes to amend an image segmentation generated at step S4-16 (this signal being generated by the user in this embodiment by pointing and clicking on the icon 310-324 corresponding to the segmentation which it is desired to amend).

If it is determined at step S4-18 that an image segmentation is to be changed then, at step S4-20, image segmentation editor 70 amends the segmentation selected by the user at step S4-18 in accordance with user input instructions.

Figure 8:
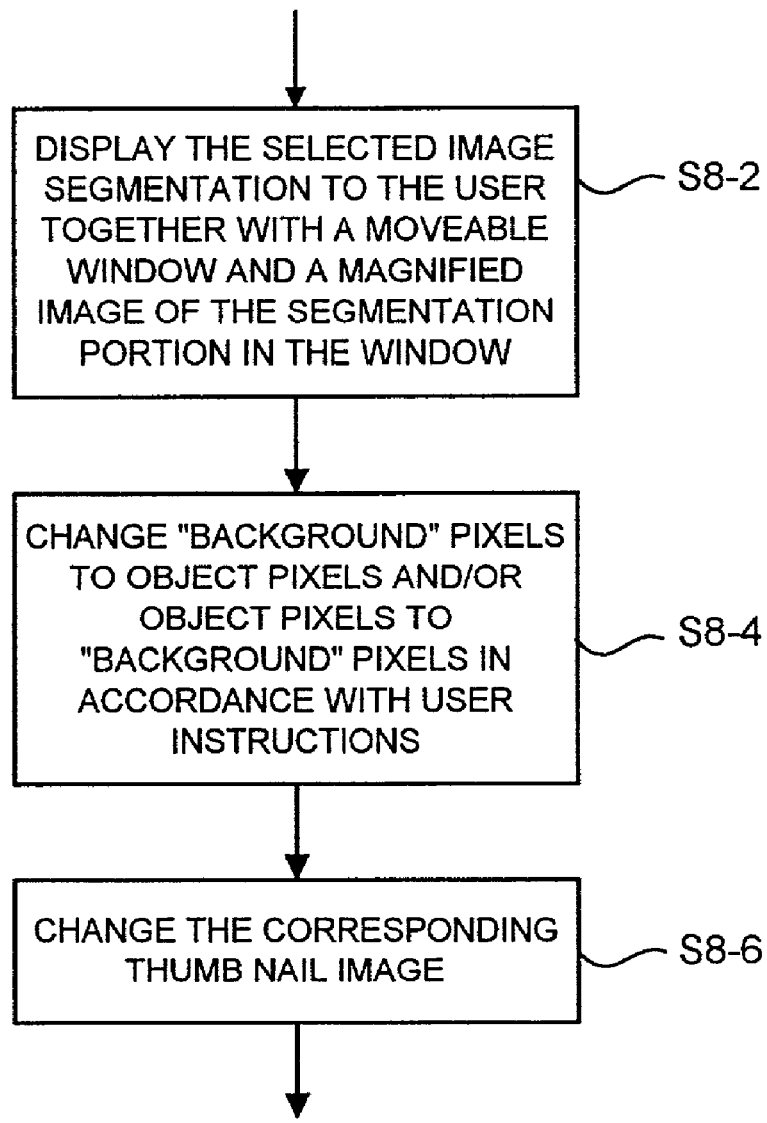
FIG. 8 shows the processing operations performed at step S4-20 in FIG. 4.

FIG. 8 shows the processing operations performed by image segmentation editor 70 during the interactive amendment of an image segmentation at step S4-20.

Referring to FIG. 8, at step S8-2, image segmentation editor 70 causes display processor 110 to display the image segmentation selected by the user at step S4-18 (by pointing and clicking on the corresponding icon) on display device 4 for editing. More particularly, referring the FIG. 9, in this embodiment, the image segmentation selected by the user at step S4-18 is displayed in a window 400 in a form larger than that in the icon image. In this embodiment, the image segmentation displayed in window 400 has the same number of pixels as the input image which was processed to generate the segmentation. In addition, the border of the icon selected by the user (icon 318 in the example of FIG. 9) is highlighted or the icon is otherwise distinguished from the other icons to indicate that this is the segmentation displayed in enlarged form for editing.

Also at step S8-2, image segmentation editor 70 causes display processor 110 to display a window 402 moveable by the user over the displayed image segmentation within window 400. In addition, image segmentation editor 70 causes display processor 110 to display a further window 410 in which the part of the image segmentation contained in window 402 is shown in magnified form so that the user can see which pixels were determined by the image data segmenter 60 at step S4-16 to belong to the object 210 or to features on the photographic mat 34 and which pixels were determined to be background pixels.

At step S8-4, image segmentation editor 70 changes the pixels displayed in window 410 from background pixels to object pixels (that is, pixels representing object 210 or features on the photographic mat 34) and/or changes object pixels to background pixels in accordance with user instructions. More particularly, for editing purposes, image segmentation editor 70 causes display processor 110 to display a pointer 412 which, in this embodiment, has the form of a brush, which the user can move using a user input device 6 such as a mouse to designate pixels to be changed in window 410. In this embodiment, each pixel which the user touches with the pointer 412 changes to an object pixel if it was previously a background pixel or changes to a background pixel if it was previously an object pixel. In this embodiment, the segmentation editor 70 causes display processor 110 to display a user-selectable button 414, the selection of which causes pointer 412 to become wider (so that more pixels can be designated at the same time thereby enabling large areas in window 410 to be changed quickly) and a user-selectable button 416, the selection of which causes the pointer 412 to become narrower.

By performing processing in this way, the user is, for example, able to edit a segmentation generated by image data segmenter 60 to designate as background pixels any pixels mistakenly determined by image data segmenter 60 to relate to the subject object 210 (for example pixel data relating to the mark 220 on surface 200 which would not be separated from image data relating to subject object 210 by image data segmenter 60 if it has the same colour as a colour in subject object 210) and/or to designate as background pixels pixels relating to each feature on the photographic mat 34 which touches the outline of the subject object 210 in an image segmentation (as shown in the example of FIG. 9) which, if not corrected, have been found to cause errors in the three-dimensional computer model of the subject object subsequently generated by surface modeller 80. Similarly, the user is able to designate as background pixels pixels relating to shadows on the photographic mat 34 and/or surface 200 which have mistakenly been determined by image data segmenter 60 to be pixels relating to the subject object 210.

At step S8-6, after the user has finished editing the segmentation currently displayed (by pointing and clicking on a different icon 310-324 or by pointing and clicking on the "start processing" button 344), icon controller 100 causes display processor 110 to change the displayed icon corresponding to the segmentation edited by the user at step S8-4 (icon 318 in the example of FIG. 9) to show the changes to the image segmentation made by the user at step S8-4.

Referring again to FIG. 4, at step 54-22, image segmentation editor 70 determines whether the user wishes to make any further changes to an image segmentation, that is, whether the user has pointed and clicked on a further icon 310-324.

When it is determined at step S4-18 or step S4-22 that no further changes are to be made to an image segmentation (that is, the user has pointed and clicked on the "start processing" button 344), then processing proceeds to step S4-24.

At step S4-24, surface modeller 80 performs processing to generate data defining a 3D computer model of the surface of subject object 210.

In this embodiment, the processing at step S4-24 is performed in a conventional manner, and comprises the following three stages:

(1) The camera positions and orientations generated at step S4-14 and the segmented image data at steps S4-16 and S4-20 is processed to generate a voxel carving, which comprises data defining a 3D grid of voxels enclosing the object. Surface modeller 80 performs processing for this stage in a conventional manner, for example as described in "Rapid Octree Construction from Image Sequences" by R. Szeliski in CVGIP: Image Understanding, Volume 58, Number 1, July 1993, pages 23-32. However, in this embodiment, the start volume defined by surface modeller 80 on which to perform the voxel carve processing comprises a cuboid having vertical side faces and horizontal top and bottom faces. The vertical side faces are positioned so that they touch the edge of the pattern of features on the photographic mat 34 (and therefore wholly contain the subject object 210). The position of the top face is defined by intersecting a line from the focal point of the camera 230 through the top edge of any one of the input images stored at step S4-4 with a vertical line through the centre of the photographic mat 34. More particularly, the focal point of the camera 230 and the top edge of an image are known as a result of the position and orientation calculations performed at step S4-14 and, by setting the height of the top face to correspond to the point where the line intersects a vertical line through the centre of the photographic mat 34, the top face will always be above the top of the subject object 210 (provided that the top of the subject object 210 is visible in each input image). The position of the horizontal base face is set to be slightly above the plane of the photographic mat 34. By setting the position of the base face in this way, features in the pattern on the photographic mat 34 (which were not separated from the subject object in the image segmentation performed at step S4-16 or step S4-20) will be disregarded during the voxel carving processing and a 3D surface model of the subject object 210 alone will be generated.

(2) The data defining the voxel carving is processed to generate data defining a 3D surface mesh of triangles defining the surface of the object 210. In this embodiment, this stage of the processing is performed by surface modeller 80 in accordance with a conventional marching cubes algorithm, for example as described in W. E. Lorensen and H. E. Cline: "Marching Cubes: A High Resolution 3D Surface Construction Algorithm", in Computer Graphics, SIGGRAPH 87 proceedings, 21: 163-169, July 1987, or J. Bloomenthal: "An Implicit Surface Polygonizer", Graphics Gems IV, AP Professional, 1994, ISBN 0123361559, pp 324-350.

(3) The number of triangles in the surface mesh generated at stage 2 is substantially reduced by performing a decimation process.

In stage 3, surface modeller 80 performs processing in this embodiment to carry out the decimation process by randomly removing vertices from the triangular mesh generated in stage 2 to see whether or not each vertex contributes to the shape of the surface of object 210. Vertices which do not contribute to the shape are discarded from the triangulation, resulting in fewer vertices (and hence fewer triangles) in the final model. The selection of vertices to remove and test is carried out in a random order in order to avoid the effect of gradually eroding a large part of the surface by consecutively removing neighbouring vertices. The decimation algorithm performed by surface modeller 80 in this embodiment is described below in pseudo-code.

INPUT

Read in vertices

Read in triples of vertex IDs making up triangles

PROCESSING

Repeat NVERTEX times
    Choose a random vertex V, which hasn't been chosen before
    Locate set of all triangles having V as a vertex, S Order S so adjacent triangles are next to each other
    Re-triangulate triangle set, ignoring V (i.e. remove selected triangles & V and then fill in hole)
    Find the maximum distance between V and the plane of each triangle
    If (distance < threshold)
        Discard V and keep new triangulation
    Else
        Keep V and return to old triangulation

OUTPUT

Output list of kept vertices

Output updated list of triangles

Since the absolute positions of the features on photographic mat 34 are known (the features having been printed in accordance with prestored data defining the positions), the 3D computer model of the surface of object 210 is generated at step S4-24 to the correct scale.

At step S4-26, surface texturer 90 processes the input image data to generate texture data for each surface triangle in the surface model generated by surface modeller 80 at step S4-24.

More particularly, in this embodiment, surface texturer 90 performs processing in a conventional manner to select each triangle in the surface mesh generated at step S4-24 and to find the input image "i" which is most front-facing to a selected triangle. That is, the input image is found for which the value $\hat{n}_t \cdot \hat{v}_i$ is largest, where $\hat{n}_t$ is the triangle normal and $\hat{v}_i$ is the viewing direction for the "i"th image. This identifies the input image in which the selected surface triangle has the largest projected area.

The selected surface triangle is then projected into the identified input image, and the vertices of the projected triangle are used as texture coordinates to define an image texture map.

The result of performing the processing described above is a VRML (or similar format) model of the surface of object 210, complete with texture coordinates defining image data to be rendered onto the model.

At step S4-28, central controller 20 outputs the data defining the 3D computer model of the object 210 from output data store 120, for example as data stored on a storage device such as disk 122 or as a signal 124 (FIG. 1). In addition, or instead, central controller 20 causes display processor 110 to display an image of the 3D computer model of the object 210 rendered with texture data in accordance with a viewpoint input by a user, for example using a user input device 6. Alternatively, the data defining the position and orientation of the camera 230 for each input image generated at step S4-14 and the data defining the segmentation of each input image generated at steps S4-16 and S4-20 may be output, for example as data recorded on a storage device such as disk 122 or as a signal 124. This data may then be input into a separate processing apparatus programmed to perform steps S4-24 and S4-26.

Many modifications can be made to the embodiment described above within the scope of claims.

For example, in the embodiments above, each icon 310-324 representing an input image is a reduced-pixel version (thumb nail image) of the input image itself. However, depending upon the number of pixels in the input image and the number of pixels available on the display of display device 4, each icon may contain all of the pixels from the input image.

In the embodiment described above, at step S4-4, data input by a user defining the intrinsic parameters of camera 230 is stored. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237-256, Azores 1993.

In the embodiment described above, image data from an input image relating to the subject object 210 is segmented from the image data relating to the background as described above with reference to FIG. 6. However, other conventional segmentation methods may be used instead. For example, a segmentation method may be used in which a single RGB value representative of the colour of the photographic mat 34 and background (or just the background in the second embodiment) is stored and each pixel in an input image is processed to determine whether the Euclidean distance in RGB space between the RGB background value and the RGB pixel value is less than a specified threshold.

In the embodiment above, at step S6-44, icon controller 100 updates the thumb nail image as each pixel in the corresponding input image is processed by image data segmenter 60. That is, step S6-44 is performed as part of the loop comprising steps S6-34 to S6-46. However, instead, icon controller 100 may update the thumb nail image after all pixels in the input image have been processed. That is, step S6-44 may be performed after step S6-46. In this way, each thumb nail image is only updated to show the result of the segmentation processing when steps S6-34 to S6-42 have been performed for every pixel in the input image.

In the embodiment above, step S8-6 is performed to update a thumb nail image after the user has finished editing a segmentation for an input image at step S8-4. However, instead, step S8-6 may be performed as the input image segmentation is edited, so that each thumb nail image displays in real-time the result of the segmentation editing.

In the embodiment described above, the icon representing each input image is a reduced-pixel version of the input image itself, and each icon is changed as segmentation processing progresses to show the result of the image data segmentation operation on the particular input image corresponding to the icon. However, each icon may be purely schematic and unrelated in appearance to the input image. For example, each icon may be a simple geometric shape of uniform colour, and the colour may be changed (or the icon changed in some other visible way) to indicate that the segmentation processing operation is complete for the input image.

In the embodiment described above, a segmentation is selected for editing at step S4-18 by the user pointing and clicking on the corresponding icon 310-328. However, a segmentation can be selected for editing in a way other than selecting the corresponding icon. For example, a segmentation may be selected by typing a number corresponding to the input image for which the user wishes to edit the segmentation.

In the embodiment described above, at step S4-24, surface modeller 80 generates data defining a 3D computer model of the surface of subject object 210 using a voxel carving technique. However, other techniques may be used, such as a voxel colouring technique for example as described in University of Rochester Computer Sciences Technical Report Number 680 of January 1998 entitled "What Do N Photographs Tell Us About 3D Shape?" and University of Rochester Computer Sciences Technical Report Number 692 of May 1998 entitled "A Theory of Shape by Space Carving", both by Kiriakos N. Kutulakos and Stephen M. Seitz.

In the embodiment above, image segmentation editor 70 is arranged to perform processing at editing step S8-4 so that each pixel which the user touches with the pointer 412 changes to an object pixel if it was previously a background pixel or changes to a background pixel if it was previously an object pixel. However, instead, image segmentation editor 70 may be arranged to perform processing so that the user selects a background-to-object pixel editing mode using a user input device 6 and, while this mode is selected, each pixel which the user touches with the pointer 412 changes to an object pixel if it was previously a background pixel, but object pixels do not change to background pixels. Similarly, the user may select an object-to-background change mode, in which each pixel which the user touches with the pointer 412 changes to a background pixel if it was previously an object pixel, but background pixels do not change to object pixels.

In the embodiment described above, image segmentations are amended at step S4-20 to designate as background pixels, any pixels mistakenly determined by image data segmenter 60 to relate to the subject object 210 (for example, pixels relating to shadows and surface features etc which touch the outline of the subject object 210 in an image). However, in addition or instead, processing may be performed at step S4-20 to designate as background pixels any pixels relating to one or more additional objects which touch the subject object 210 in real life (for example, a stand which supports the subject object 210) and/or one or more unwanted parts of the subject object 210 itself. In this way, the 3D computer model generated at step S4-24 does not include the additional object(s) or the part(s) unwanted by the user.

In the embodiment described above, processing is performed by a computer using processing routines defined by programming instructions. However, some, or all, of the processing could be performed using hardware.

The invention claimed is:

1. A method of processing data defining a plurality of images of an object recorded at different positions and orientations to generate data defining a three-dimensional computer model of the object, comprising:

receiving image data defining a plurality of images of an object recorded at different positions and orientations, and data defining the positions and orientations;

processing the image data to segment data relating to the object from other image data in at least some of the images;

generating data for display to a user showing the results of said segmentation processing;

receiving signals input by the user defining changes to the result of said segmentation processing on at least one image;

amending the results of said segmentation processing in accordance with the signals received from the user; and generating data defining a three-dimensional computer model of the object using the results of said segmentation processing, including any amended results, and the data defining the positions and orientations at which the images were recorded.

2. A method according to claim 1, wherein the generation of data for display to a user showing the results of said segmentation processing comprises generating data defining a thumb nail image of each image processed showing the results of said segmentation processing, each thumb nail image being selectable by the user, and, in response to the selection of a thumb nail image by the user, generating data for display defining the selected image in a larger form showing the results of said segmentation processing for editing by the user.

3. A method according to claim 1, further comprising:
generating data for display defining a pointer moveable by the user over the displayed results of said segmentation processing; and
changing data defined as data relating to the object to non-object data and data defined as non-object data to data relating to the object in accordance with data designated by the user using the pointer.

4. A method according to claim 3, further comprising generating data for display defining the pointer with a changed size in accordance with instructions input by the user.

5. A method according to claim 1, wherein the generation of data defining a three-dimensional computer model includes:
defining a volume of voxels; and
removing voxels in dependence upon the results of said segmentation processing, including any amended results, and the data defining the positions and orientations at which the images were recorded.

6. A method according to claim 1, further comprising generating a signal conveying the data defining the three-dimensional computer model.

7. A method according to claim 6, further comprising recording the signal either directly or indirectly.

8. An image processing method, comprising:
receiving image data defining a plurality of images of an object recorded at different positions and orientations;
processing the image data to classify data in at least some of the images as either data relating to the object or as other image data;
generating data for display to a user showing the results of said processing;
receiving signals input by the user defining changes to the result of said processing on at least one image; and
amending the results of said processing in accordance with the signals received from the user.

9. A method according to claim 8, further comprising generating a signal conveying the results of said processing, including the amended results.

10. A method according to claim 9, further comprising recording the signal either directly or indirectly.

11. A method of processing data defining a plurality of images of an object recorded at different positions and orientations to generate data defining a three-dimensional computer model of the object, comprising:
processing image data defining a plurality of images of an object recorded at different positions and orientations, to segment data relating to the object from other image data in at least some of the images;
displaying the results of said segmentation processing to a user;
amending the results of said segmentation processing to remove image data relating to shadows or surface features touching the object from image data relating to the object; and
generating data defining a three-dimensional computer model of the object using the results of said segmentation processing, including the amended results, and data defining the positions and orientations at which the images were recorded.

12. A method of processing data defining a plurality of images of a subject object and an abutting additional object recorded at different positions and orientations to generate data defining a three-dimensional computer model of the subject object, comprising:
processing image data defining a plurality of images of the subject object and the additional object recorded at different positions and orientations, to segment data relating to the subject object and additional object from other image data in at least some of the images;
displaying the results of said segmentation processing to a user;
amending the results of said segmentation processing to remove image data relating to the additional object from image data relating to the subject object; and
generating data defining a three-dimensional computer model of the subject object using the results of said segmentation processing, including the amended results, and data defining the positions and orientations at which the images were recorded.

13. A method of processing data defining a plurality of images of an object recorded at different positions and orientations to generate data defining a three-dimensional computer model of the object, comprising:
processing image data defining a plurality of images of an object recorded at different positions and orientations, to segment data relating to the object from other image data in at least some of the images;
displaying the results of said segmentation processing to a user;
amending the results of said segmentation processing to remove image data relating to at least a first part of the object from image data relating to other parts of the object; and
generating data defining a three-dimensional computer model of the object without the first part using the results of said segmentation processing, including the amended results, and data defining the positions and orientations at which the images were recorded.

14. Apparatus operable to process data defining a plurality of images of an object recorded at different positions and orientations to generate data defining a three-dimensional computer model of the object, comprising:
a data receiver for receiving image data defining a plurality of images of an object recorded at different positions and orientations, and data defining the positions and orientations;
an image data segmenter operable to process the image data to segment data relating to the object from other image data in at least some of the images;
a display data generator operable to generate data for display to a user showing the results of the segmentation processing;
a user input signal receiver for receiving signals input by the user defining changes to the result of the segmentation processing on at least one image;

a segmentation result editor operable to amend the results of the segmentation processing in accordance with the signals received from the user; and a computer model generator operable to generate data defining a three-dimensional computer model of the object using the results of the segmentation processing, including any amended results, and the data defining the positions and orientations at which the images were recorded.

15. Apparatus according to claim 14, wherein the display data generator is operable to:

generate data defining a thumb nail image of each image processed showing the results of the segmentation processing;

perform processing so that each thumb nail image is selectable by the user; and generate data for display in response to the selection of a thumb nail image by the user defining the selected image in a larger form showing the results of the segmentation processing for editing by the user.

16. Apparatus according to claim 14, further comprising:

a pointer generator operable to generate data for display defining a pointer moveable by the user over the displayed results of the segmentation processing; and a data changer operable to change data defined as data relating to the object to non-object data and data defined as non-object data to data relating to the object in accordance with data designated by the user using the pointer.

17. Apparatus according to claim 16, wherein said pointer generator is operable to generate data for display defining the pointer with a changed size in accordance with instructions input by the user.

18. Apparatus according to claim 14, wherein the computer model generator includes:

a voxel definer operable to define a volume of voxels; and a voxel remover operable to remove voxels in dependence upon the results of the segmentation processing, including any amended results, and the data defining the positions and orientations at which the images were recorded.

19. An image processing apparatus, comprising:

a data receiver to receive image data defining a plurality of images of an object recorded at different positions and orientations;

a data classifier operable to process the image data to classify data in at least some of the images as either data relating to the object or as other image data;

a result data generator operable to generate data for display to a user showing the results of the processing;

a user input signal receiver to receive signals input by the user defining changes to the result of the processing on at least one image; and a results data processor operable to amend the results of the processing in accordance with the signals received from the user.

20. Apparatus for processing data defining a plurality of images of an object recorded at different positions and orientations to generate data defining a three-dimensional computer model of the object, comprising:

means for receiving image data defining a plurality of images of an object recorded at different positions and orientations, and data defining the positions and orientations;

means for processing the image data to segment data relating to the object from other image data in at least some of the images;

means for generating data for display to a user showing the results of the segmentation processing;

means for receiving signals input by the user defining changes to the result of the segmentation processing on at least one image;

means for amending the results of the segmentation processing in accordance with the signals received from the user; and means for generating data defining a three-dimensional computer model of the object using the results of the segmentation processing, including any amended results, and the data defining the positions and orientations at which the images were recorded.

21. An image processing apparatus, comprising:

means for receiving image data defining a plurality of images of an object recorded at different positions and orientations;

means for processing the image data to classify data in at least some of the images as either data relating to the object or as other image data;

means for generating data for display to a user showing the results of the processing;

means for receiving signals input by the user defining changes to the result of the processing on at least one image; and means for amending the results of the processing in accordance with the signals received from the user.

22. A storage device storing instructions for causing a programmable processing apparatus to become operable to perform a method as set out in at least one of claims 1, 8, 11, 12 and 13.

23. A physically-embodied computer program product carrying computer program instructions in computer-readable form including instructions to program a programmable processing apparatus to become operable to perform a method as set out in at least one of claims 1, 8, 11, 12 and 13.

* * * * *